United States Patent
Mills et al.

(10) Patent No.: US 10,828,981 B2
(45) Date of Patent: Nov. 10, 2020

(54) ELECTRONIC FUEL TANK SYSTEM HAVING CAM ACTUATED VENTING WITH CANISTER LINE ISOLATION

(71) Applicant: Eaton Intelligent Power Limited, Dublin (IE)

(72) Inventors: Vaughn Kevin Mills, Chelsea, MI (US); Max Franklin, Birmingham, MI (US); Robert P. Benjey, Dexter, MI (US)

(73) Assignee: Eaton Intelligent Power Limited, Dublin (IE)

( * ) Notice: Subject to any disclaimer, the term of this patent is extended or adjusted under 35 U.S.C. 154(b) by 12 days.

(21) Appl. No.: 16/211,871

(22) Filed: Dec. 6, 2018

(65) Prior Publication Data

US 2019/0105984 A1  Apr. 11, 2019

Related U.S. Application Data

(63) Continuation of application No. PCT/US2017/036885, filed on Jun. 9, 2017.
(Continued)

(51) Int. Cl.
*B60K 15/03* (2006.01)
*B60K 15/035* (2006.01)
(Continued)

(52) U.S. Cl.
CPC ...... *B60K 15/03504* (2013.01); *B60K 15/035* (2013.01); *B60K 15/03519* (2013.01);
(Continued)

(58) Field of Classification Search
CPC ............ B60K 15/03504; B60K 15/077; B60K 15/035; B60K 15/03519;
(Continued)

(56) References Cited

U.S. PATENT DOCUMENTS 5,878,725 A * 3/1999 Osterbrink ......... F02M 25/0836
123/516
6,003,568 A * 12/1999 Strnad, Jr. .............. B60K 15/04
123/519
(Continued)

FOREIGN PATENT DOCUMENTS

WO  2016049320 A1  3/2016

OTHER PUBLICATIONS

International Search Report and Written Opinion for International Application No. PCT/US2017/036885 dated Aug. 28, 2017, 16 pages.

*Primary Examiner* — Joseph J Dallo
(74) *Attorney, Agent, or Firm* — RMCK Law Group PLC (57) ABSTRACT

An evaporative emissions control system configured to recapture and recycle emitted fuel vapor on a vehicle fuel tank is provided. The control system includes a first and second vent tube disposed in the fuel tank, a first and second vent valve, a vent shut-off assembly, a purge canister and a control module. The vent shut-off assembly selectively opens and closes the first and second valves to provide overpressure and vacuum relief for the fuel tank. The control module regulates operation of the vent shut-off assembly based on operating conditions to vent the first and second vent valves to the purge canister. The vehicle fuel tank comprises a saddle tank having first and second lobes and a raised portion arranged generally at a top portion of the fuel tank. The first vent valve is arranged generally in the first lobe and the second vent valve is arranged in the raised portion.

21 Claims, 9 Drawing Sheets

Related U.S. Application Data

(60) Provisional application No. 62/475,584, filed on Mar. 23, 2017, provisional application No. 62/465,482, filed on Mar. 1, 2017, provisional application No. 62/455,178, filed on Feb. 6, 2017, provisional application No. 62/347,777, filed on Jun. 9, 2016.

(51) Int. Cl.
*F02M 25/08* (2006.01)
*B60K 15/077* (2006.01)

(52) U.S. Cl.
CPC ......... *B60K 15/077* (2013.01); *F02M 25/089* (2013.01); *F02M 25/0836* (2013.01); *F02M 25/0872* (2013.01); *B60K 2015/03514* (2013.01); *B60K 2015/03571* (2013.01); *B60K 2015/03576* (2013.01); *B60K 2015/03585* (2013.01)

(58) Field of Classification Search
CPC ........... B60K 2015/03585; B60K 2015/03576; B60K 2015/03514; B60K 2015/03571; F02M 25/0836; F02M 25/0872; F02M 25/089

See application file for complete search history.

(56) References Cited

U.S. PATENT DOCUMENTS

| | | | |
|---|---|---|---|
| 6,024,137 A * | 2/2000 | Strnad | B67D 7/0401 141/1 |
| 6,213,170 B1 * | 4/2001 | Burke | B01D 35/0273 141/59 |
| 6,230,693 B1 * | 5/2001 | Meiller | F02M 25/0854 123/519 |
| 6,354,343 B1 * | 3/2002 | Strnad | B67D 7/0401 141/94 |
| 6,609,537 B1 | 8/2003 | Horrer et al. | |
| 2001/0029931 A1 * | 10/2001 | Burke | F02M 25/089 123/520 |
| 2014/0158094 A1 * | 6/2014 | Meiller | F02M 27/00 123/518 |
| 2015/0114350 A1 * | 4/2015 | Pursifull | F02M 35/10019 123/445 |
| 2016/0348614 A1 * | 12/2016 | Dudar | F02D 41/22 |
| 2017/0174501 A1 * | 6/2017 | Dudar | B67D 7/3272 |
| 2017/0292476 A1 * | 10/2017 | Dudar | F02M 25/089 |

* cited by examiner

ELECTRONIC FUEL TANK SYSTEM HAVING CAM ACTUATED VENTING WITH CANISTER LINE ISOLATION

CROSS-REFERENCE TO RELATED APPLICATIONS

This application is a continuation of International Application No. PCT/US2017/036885 filed Jun. 9, 2017, which claims the benefit of U.S. Patent Application No. 62/475,584 filed on Mar. 23, 2017, U.S. Patent Application No. 62/465,482 filed on Mar. 1, 2017, U.S. Patent Application No. 62/455,178 filed on Feb. 6, 2017, U.S. Patent Application No. 62/347,777 filed on Jun. 9, 2016. The disclosures of the above applications are incorporated herein by reference.

FIELD

The present disclosure relates generally to fuel tanks on passenger vehicles and more particularly to a fuel tank having an electronically controlled module that manages the complete evaporative system for the vehicle.

BACKGROUND

Fuel vapor emission control systems are becoming increasingly more complex, in large part in order to comply with environmental and safety regulations imposed on manufacturers of gasoline powered vehicles. Along with the ensuing overall system complexity, complexity of individual components within the system has also increased. Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An evaporative emissions control system configured to recapture and recycle emitted fuel vapor on a vehicle fuel tank is provided. The control system includes a first vent tube, a first vent valve, a canister vent tube, a canister vent valve, a vent shut-off assembly and a control module. The first vent tube is disposed on the fuel tank. The first vent valve is fluidly coupled to the first vent tube and is configured to selectively open and close a first port fluidly coupled to the first vent tube. The canister vent tube vents from the fuel tank to a purge canister. The canister vent valve is fluidly coupled to the canister vent tube and is configured to selectively open and close a canister port fluidly coupled to the canister vent tube. The vent shut-off assembly selectively opens and closes the first vent valve and the canister vent valve to provide overpressure and vacuum relief for the fuel tank. The control module regulates operation of the vent shut-off assembly based on operating conditions to vent the first vent valve and canister vent valve.

According to other features, the evaporative emissions control system includes a second vent tube disposed in the fuel tank. A second vent valve is fluidly coupled to the second vent tube and is configured to selectively open and close a second port fluidly coupled to the second vent tube. The vent shut-off assembly comprises a cam assembly having a cam shaft that includes a first cam that selectively opens and closes the second valve and a canister cam that selectively opens and closes the canister valve. The second port is configured solely as a refueling port. During refueling, the second valve is opened by the second cam until the control module controls the vent shut-off assembly to close the second valve based on a fuel level reaching a predetermined level corresponding to a "Fill" position. The evaporative emissions control system can further comprise an actuator assembly that drives the cam assembly. The actuator assembly includes a motor. A third vent tube can be disposed in the fuel tank. A third vent valve can be fluidly coupled to the third vent tube that is configured to selectively open and close a third port fluidly coupled to the third vent tube. The cam shaft includes a third cam that selectively opens and closes the third valve.

An evaporative emissions control system according to additional features and configured to recapture and recycle emitted fuel vapor on a vehicle fuel tank is provided. The control system includes a first and second vent tube disposed in the fuel tank, a first and second vent valve, a vent shut-off assembly, a purge canister and a control module. The first vent valve is disposed on the first vent tube and is configured to selectively open and close a first port fluidly coupled to the first vent tube. The second vent valve is disposed on the second vent tube and is configured to selectively open and close a second port fluidly coupled to the second vent tube. The vent shut-off assembly selectively opens and closes the first and second valves to provide overpressure and vacuum relief for the fuel tank. The purge canister is fluidly coupled to the vent shut-off assembly through a canister vent line. The control module regulates operation of the vent shut-off assembly based on operating conditions to vent the first and second vent valves to the purge canister. The vehicle fuel tank comprises a saddle tank having a first lobe, a second lobe and a raised portion arranged generally at a top portion of the fuel tank. The first vent valve is arranged generally in the first lobe and the second vent valve is arranged in the raised portion.

According to additional features, the first vent tube has a first diameter that supports a first flow rate. The second vent tube has a second diameter that supports a second flow rate. The second flow rate is higher than the first flow rate. The second vent tube is configured to support vapor flow during a refueling event. The second diameter can be at least twice as large as the first diameter. The second vent valve is positioned at an elevated location relative to the first vent valve when the vehicle is on level ground. During a refueling event, as fuel rises within the fuel tank, the first vent valve becomes submerged while the second vent valve remains in vapor space at the raised portion.

According to other features, the control module communicates with the vent shut-off assembly during the refueling event to close the first vent valve prior to closing the second vent valve. The vent shut-off assembly comprises a cam assembly having a cam shaft that includes a first cam and a second cam. The first and second cams have respective cam profiles that correspond to at least a fully opened valve position, a fully closed valve position and a partially open valve position. The first and second vent valves are caused to selectively open and close based on rotation of the respective first and second cams to deliver fuel vapor through the respective first and second vent tubes. An actuator assembly drives the cam assembly. The actuator assembly includes a motor. The motor can comprise a direct current motor that rotates a worm gear that in turn drives a drive gear coupled to the cam shaft. The second port is configured solely as a refueling port. During refueling, the second valve is opened by the second cam until the control module controls the vent shut-off assembly to close the second valve based on a fuel level reaching a predetermined level corresponding to a "Fill" position.

In other features, a third vent tube is disposed in the second lobe of the saddle fuel tank. A third vent valve is disposed on the third vent tube and is configured to selectively open and close a second port fluidly coupled to the third vent tube. The second vent valve is positioned at an elevated location relative to the third vent valve when the vehicle is on level ground.

A method of controlling an evaporative emissions control system associated with a fuel tank. The control system is configured to recapture and recycle emitted fuel vapor. The control system includes a first vent valve configured to selectively open and close a first vent positioned in first location in the fuel tank. A second valve is configured to selectively open and close a second vent positioned in a second location in the fuel tank. A first fuel tank fuel level is determined. A second fuel tank fuel level is determined. Control determines if the second fuel tank fuel level is greater than the first fuel tank fuel level. The first vent valve is closed. Fuel vapor is vented through the second vent valve to a purge canister. Fuel vapor is continued to vent fuel vapor through the second vent valve subsequent to fuel rising above the first vent valve.

The control system further comprises a third vent valve arranged in a third location in the fuel tank. The third vent valve is closed based on the second fuel tank fuel level being greater than the first fuel tank fuel level. Fuel vapor is continued to be vented through the second valve subsequent to fuel rising above the third vent valve. Determining the first and second fuel tank fuel levels comprises receiving a signal from a tank fuel level sensor. A vehicle grade position is determined. At least one of the first and second vent valves are closed based on the vehicle grade position. A vehicle acceleration is determined. At least one of the first and second vent valves are closed based on the vehicle acceleration.

In additional features, the control system further includes a vent shut-off assembly including a first cam having a first cam profile corresponding to a fully closed valve position. A second cam profile corresponds to a partially opened valve position. A third cam profile corresponds to a fully opened valve position. The first cam is rotated to a position wherein the second cam profile opens the first vent valve to the partially opened position. The fuel tank can comprise a saddle fuel tank having a first lobe, a second lobe and a raised portion arranged generally at a top portion of the fuel tank. The first vent is positioned in the first lobe. The second vent is positioned in the raised portion. The third vent is positioned in the second lobe.

BRIEF DESCRIPTION OF THE DRAWINGS

The present disclosure will become more fully understood from the detailed description and the accompanying drawings, wherein.

DETAILED DESCRIPTION

Figure 1:
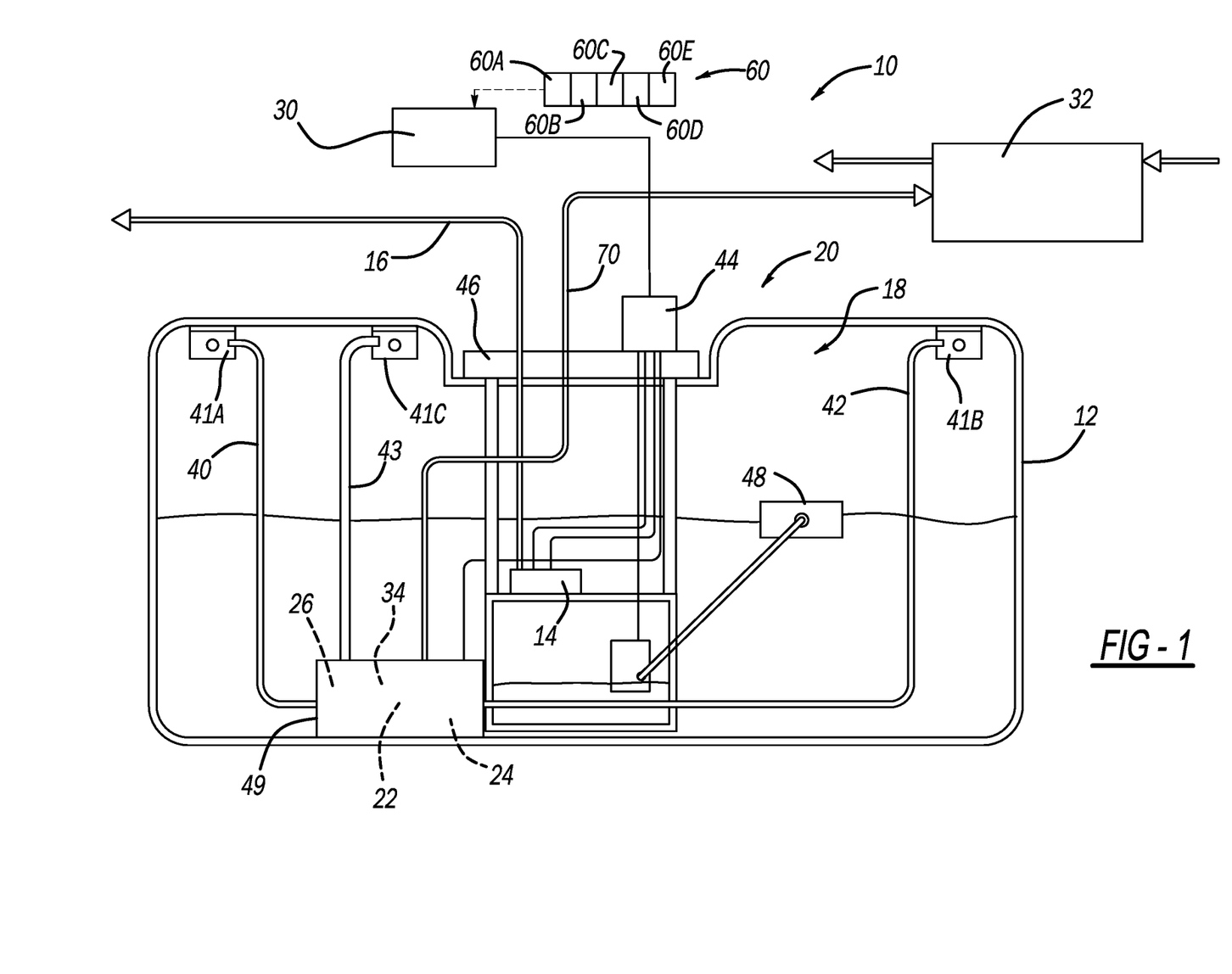
FIG. 1 is a schematic illustration of a fuel tank system having an evaporative emissions control system including a vent shut-off assembly, a controller, an electrical connector and associated wiring in accordance to one example of the present disclosure.

Turning now to FIG. 1, a fuel tank system constructed in accordance to one example of the present disclosure is shown and generally identified at reference number 10. The fuel tank system 10 can generally include a fuel tank 12 configured as a reservoir for holding fuel to be supplied to an internal combustion engine via a fuel delivery system, which includes a fuel pump 14. The fuel pump 14 can be configured to deliver fuel through a fuel supply line 16 to a vehicle engine. The fuel tank 12 can define a vapor dome 18 generally at an upper portion of the fuel tank 12. An evaporative emissions control system 20 can be configured to recapture and recycle the emitted fuel vapor. As will become appreciated from the following discussion, the evaporative emissions control system 20 provides an electronically controlled module that manages the complete evaporative system for a vehicle.

The evaporative control system 20 provides a universal design for all regions and all fuels. In this regard, the requirement of unique components needed to satisfy regional regulations may be avoided. Instead, software may be adjusted to satisfy wide ranging applications. In this regard, no unique components need to be revalidated saving time and cost. A common architecture may be used across vehicle lines. Conventional mechanical in-tank valves may be replaced. As discussed herein, the evaporative control system 20 may also be compatible with pressurized systems including those associated with hybrid powertrain vehicles.

The evaporative emissions control system 20 includes a vent shut-off assembly 22, a manifold assembly 24, a liquid trap 26, a control module 30, a purge canister 32, a first vapor tube 40, a second vapor tube 42, a third vapor tube 43, an electrical connector 44, a fuel delivery module (FDM) flange 46 and a fuel fill level sensor assembly such as a float level sensor assembly 48. The first vapor tube 40 can be configured for grade venting. The first vapor tube 40 can terminate at a grade vent valve or vent opening 41A that may include a baffle arranged at a top corner of the fuel tank 12. In one operating condition where the vehicle is on a grade and the vent openings 41B and 41C are submerged, the vent shut-off assembly 22 can close the vent openings 41B and 41C while opening the vent opening 41A.

Similarly, the second vapor tube 42 can be configured for grade venting. The second vapor tube 42 can terminate at a grade vent valve or vent opening 41B that may include a baffle arranged at a top corner of the fuel tank 12. In one operating condition where the vehicle is on a grade and the vent openings 41A and 41C are submerged, the vent shut-off assembly 22 can close the vent openings 41A and 41C while opening the vent opening 41B.

The third vapor tube 43 can have a larger inner diameter tube suitable to accommodate higher flows such as during a refueling event. The third vapor tube 43 can terminate at a vent valve or vent opening 41C that may include a baffle arranged at a top of the fuel tank 12. All of the vent openings 41A-41C can terminate at a vapor dome 18.

In one example, the manifold assembly 24 can include a manifold body 49 that routes venting to an appropriate vent line or tube 40, 42 and 43 based on operating conditions. As will become appreciated from the following discussion, the vent shut-off assembly 22 can take many forms such as electrical systems including solenoids and mechanical systems including DC motor actuated cam systems.

The control module 30 can further include or receive inputs from system sensors, collectively referred to at reference 60. The system sensors 60 can include a tank pressure sensor 60A that senses a pressure of the fuel tank 12, a canister pressure sensor 60B that senses a pressure of the canister 32, a temperature sensor 60C that senses a temperature within the fuel tank 12, a tank pressure sensor 60D that senses a pressure in the fuel tank 12 and a vehicle grade sensor and or vehicle accelerometer 60E that measures a grade and/or acceleration of the vehicle. It will be appreciated that while the system sensors 60 are shown as a group, that they may be located all around the fuel tank system 10.

The control module 30 can additionally include fill level signal reading processing, fuel pressure driver module functionality and be compatible for two-way communications with a vehicle electronic control module (not specifically shown). The vent shut-off assembly 22 and manifold assembly 24 can be configured to control a flow of fuel vapor between the fuel tank 12 and the purge canister 32. The purge canister 32 adapted to collect fuel vapor emitted by the fuel tank 12 and to subsequently release the fuel vapor to the engine. The control module 30 can also be configured to regulate the operation of evaporative emissions control system 20 in order to recapture and recycle the emitted fuel vapor. The float level sensor assembly 48 can provide fill level indications to the control module 30.

Figure 2:
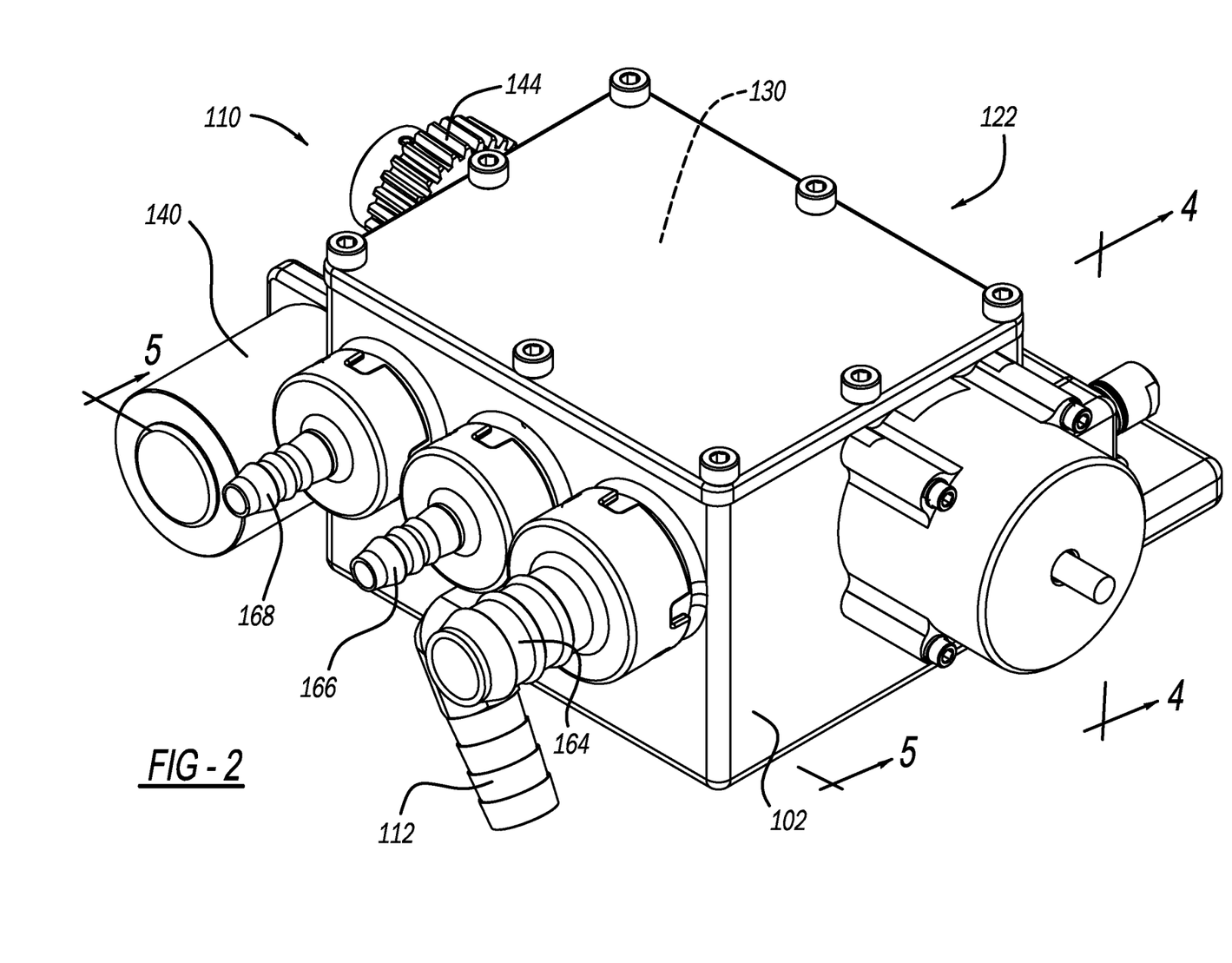
FIG. 2 is a top perspective view of a vent shut-off assembly constructed in accordance to additional features of the present disclosure.
Figure 3:
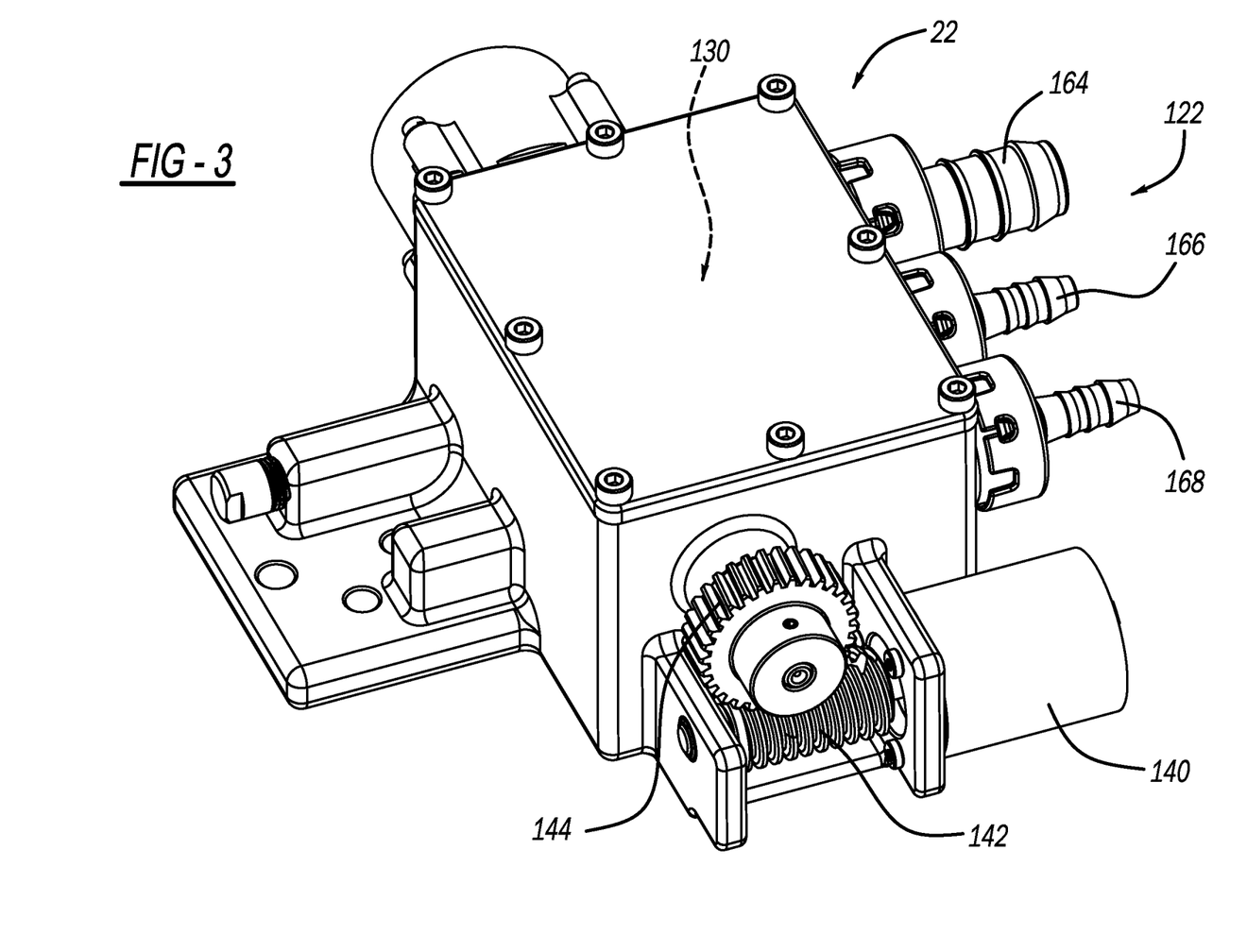
FIG. 3 is a bottom perspective view of the vent shut-off assembly of FIG. 2.
Figure 4:
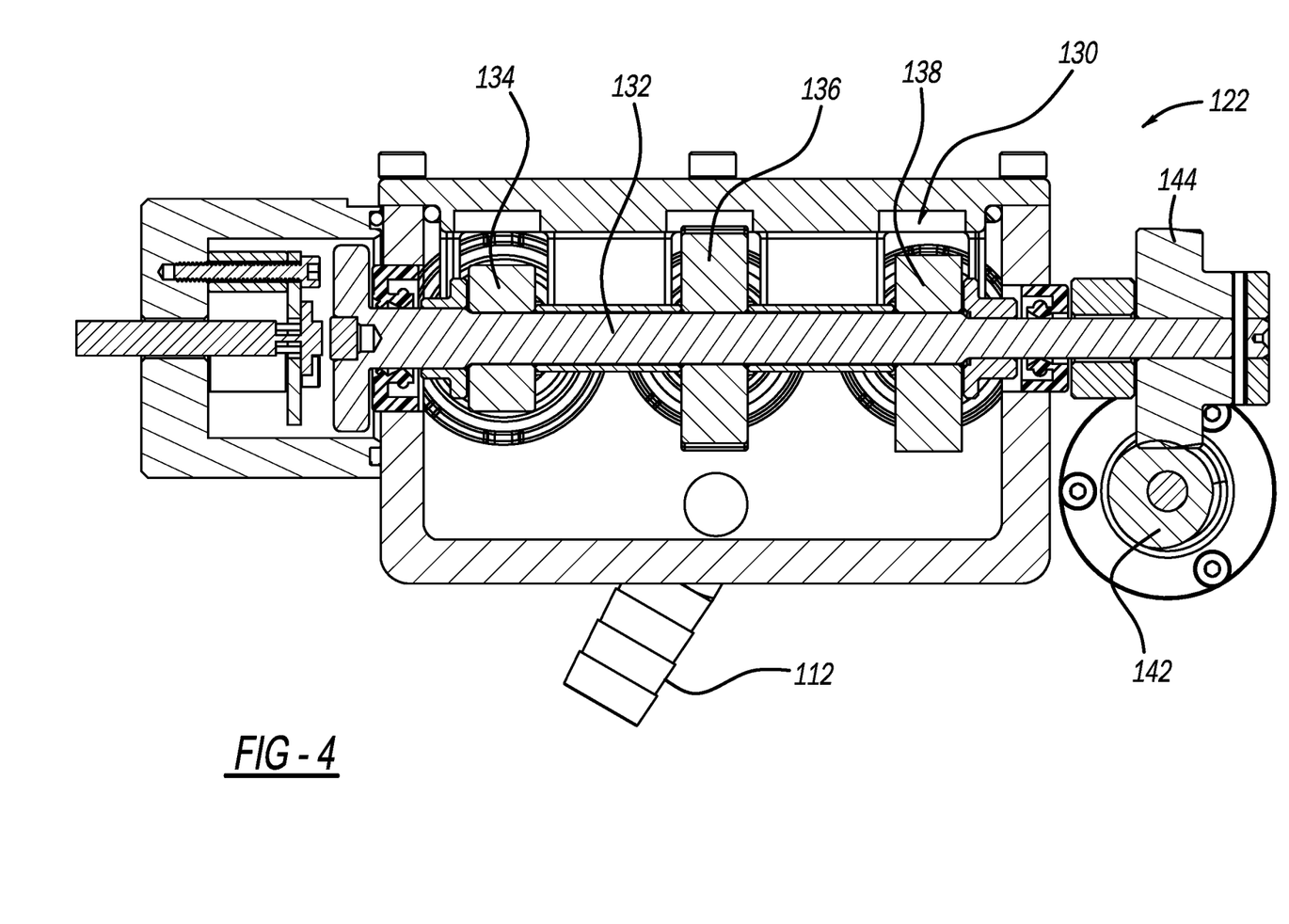
FIG. 4 is a sectional view of the vent shut-off assembly of FIG. 2 taken along lines 4-4.
Figure 5:
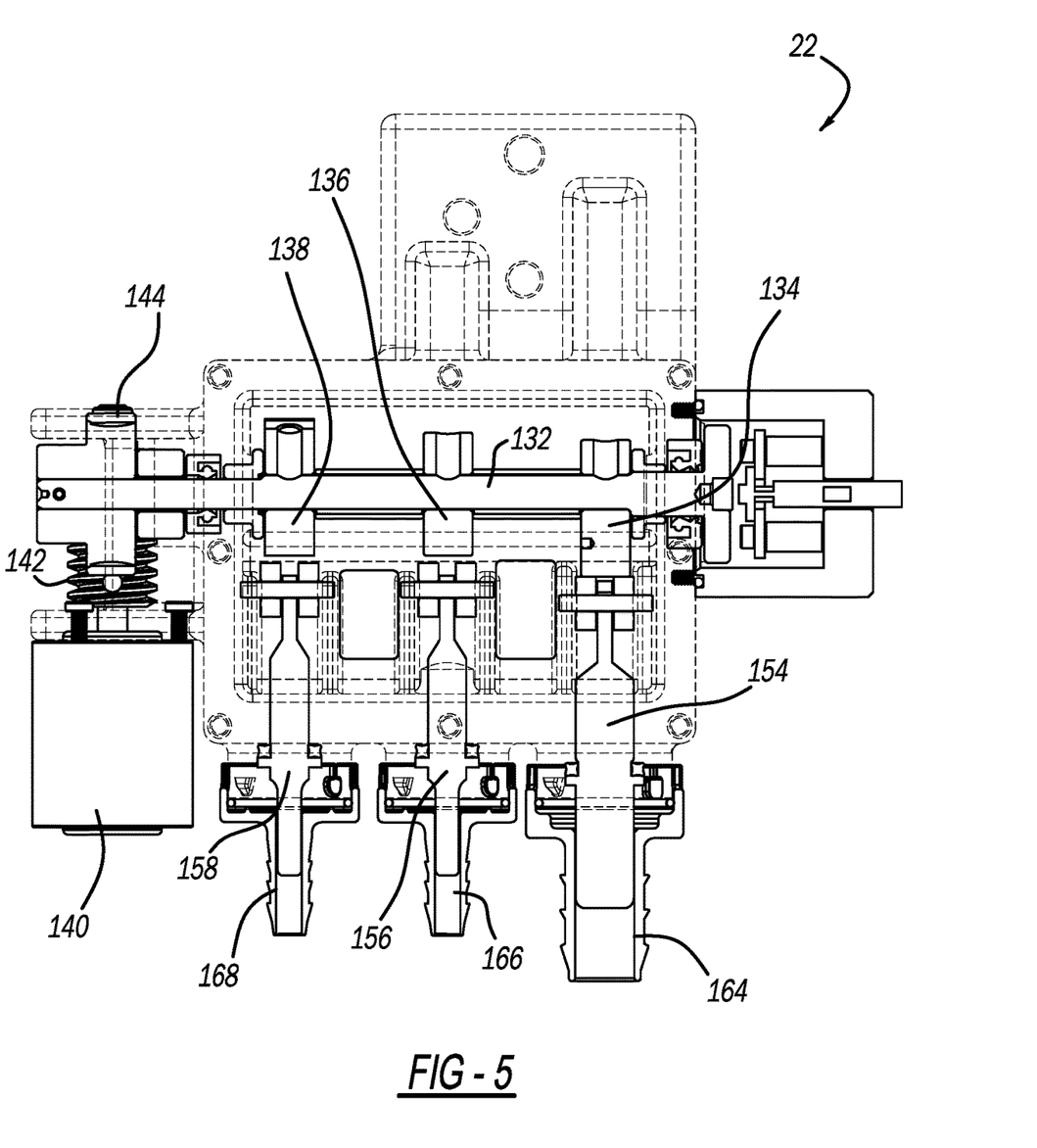
FIG. 5 is a sectional view of the vent shut-off assembly of FIG. 2 taken along lines 5-5.

With continued reference to FIGS. 1-3, additional features of the evaporative emissions control system 20 will be described. In one configuration, the vent tubes 40, 42 and 43 can be secured to the fuel tank 12 with clips. The inner diameter of the vent tubes 40 and 42 can be 3-4 mm. The inner diameter of the vent tube 43 can be 10 mm. The vent tube 43, has a higher flow capacity compared to the vent tubes 40 and 42 and can be used (opened) during refueling. The vent tubes 40, 42 and 43 can be routed to high points of the fuel tank 12. In other examples, external lines and tubes may additionally or alternatively be utilized. In such examples, the external lines are connected through the tank wall using suitable connectors such as, but not limited to, welded nipple and push-through connectors. A vent line 70 can be fluidly connected between the vent shut-off assembly 22 and the canister 32.

As identified above, the evaporative emissions control system 20 can replace conventional fuel tank systems that require mechanical components including in-tank valves with an electronically controlled module that manages the complete evaporative system for a vehicle. In this regard, some components that may be eliminated using the evaporative emissions control system 20 of the instant disclosure can include in-tank valves such as GVV's and FLVV's, canister vent valve solenoid and associated wiring, tank pressure sensors and associated wiring, fuel pump driver module and associated wiring, fuel pump module electrical connector and associated wiring, and vapor management valve(s) (system dependent). These eliminated components are replaced by the control module 30, vent shut-off assembly 22, manifold 24, and associated electrical connector 44. Various other components may be modified to accommodate the evaporative emissions control system 20 including the fuel tank 12. For example, the fuel tank 12 may be modified to eliminate valves and internal lines to pick-up points. The flange of the FDM 46 may be modified to accommodate other components such as the control module 30 and/or the electrical connector 44. In other configurations, the fresh air line of the canister 32 and a dust box may be modified. In one example, the fresh air line of the canister 32 and the dust box may be connected to the control module 30.

Turning now to FIGS. 2-5, the vent shut-off assembly 22 constructed in accordance to the present disclosure will be described. The vent shut-off assembly 22 includes a main housing 102 that at least partially houses an actuator assembly 110. A canister vent port 112 connects to the vent line 70 that is routed to the canister (see canister 32, FIG. 1). As can be appreciated, vapor that vents through any of the vent openings 41A-41C will be routed though the canister vent port 112, through the vent line 70 and to the canister 32.

Figure 6:
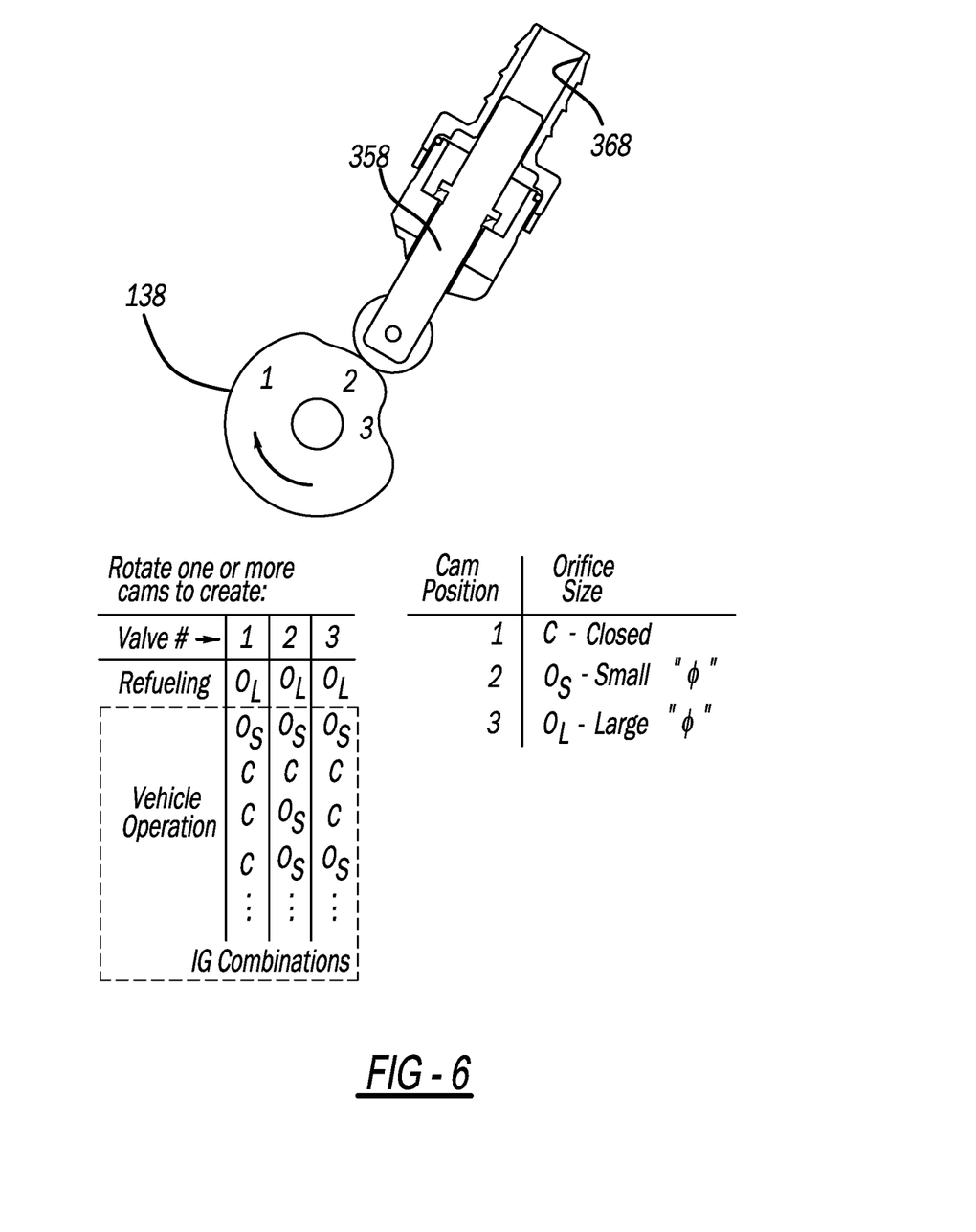
FIG. 6 is a schematic illustration of a cam driven tank venting control assembly constructed in accordance to another example of the present disclosure

The vent shut-off assembly 22 includes a cam assembly 130. The cam assembly 130 includes a cam shaft 132 that includes cams 134, 136 and 138. The cam shaft 132 is rotatably driven by a motor 140. In the example shown the motor 140 is a direct current motor that rotates a worm gear 142 that in turn drives a drive gear 144. The motor 140 is mounted outboard of the main housing 102. Other configurations are contemplated. The cams 134, 136 and 138 rotate to open and close valves 154, 156 and 158, respectively. It will be appreciated that the cams 134, 136 and/or 138 may have cam profiles that allow fully closed, fully open and partially open valve conditions according to a given application, see FIG. 6. In this regard, the cams 134, 136 and/or 138 can be configured to have a lift profile corresponding to a partially opened valve, such as 3 mm during venting or a fully opened valve, such as 8 mm during refueling. In one operating condition it is contemplated that more than one of the cams 134, 136 and 138 can be rotated to correspond to a fully opened valve position such as during refueling. It is appreciated that these values are merely exemplary and other geometries may be used. It is further contemplated that some cams may be configured with more lobes than other cams. In other arrangements, the vent shut-off assembly 22 may be configured to have less than three cams, valves, vent lines and vent openings.

The valves 154, 156 and 158 open and close to selectively deliver vapor through ports 164, 166 and 168, respectively. In one example the motor 140 can alternately be a stepper motor. In other configurations, a dedicated DC motor may be used for each valve. Each DC motor may have a home function. The DC motors can include a stepper motor, a bi-directional motor, a uni-directional motor a brushed motor and a brushless motor. The home function can include a hard stop, electrical or software implementation, trip switches, hard stop (cam shaft), a potentiometer and a rheostat. In operation, if the vehicle is parked on a grade where the port 166 is routed to a low position in the fuel tank 12, the cam 136 is rotated to a position to close the port 166.

The port 164 can be configured solely as a refueling port. During refueling, the valve 154 associated with port 164 is opened by the cam 134. The controller 30 determines that the vehicle is at rest. The controller 30 can also determine other operating conditions prior to refueling such as, but not limited to, the vehicle being close to zero grade (such as between +/−15 degrees) and the engine in the OFF position. In one configuration, the controller 30 can command the vent shut-off assembly 22 to open the valve 154. Once the fuel level sensor 48 reaches a predetermined level corresponding to a "Fill" position, or when control determines a second fuel tank fuel level is greater than a first fuel tank fuel level, the controller 30 will close the valve 154. In other configurations, the cam 134, valve 154 and port 164 can be eliminated leaving two cams 136 and 138 that open and close valves 156 and 158. In such an example, the two ports 168 and 166 can be 7.5 mm orifices. If both ports 168 and 166 are open, refueling can occur. If less flow is required, a cam position can be attained where one of the valves 156 and 158 are not opened all the way. In other examples, the controller 30 can command the vent shut-off assembly 122 to rotate the respective cams to positions corresponding to closing off an identified port based on a dynamic event such as an acceleration and/or vehicle grade position.

Figure 7:
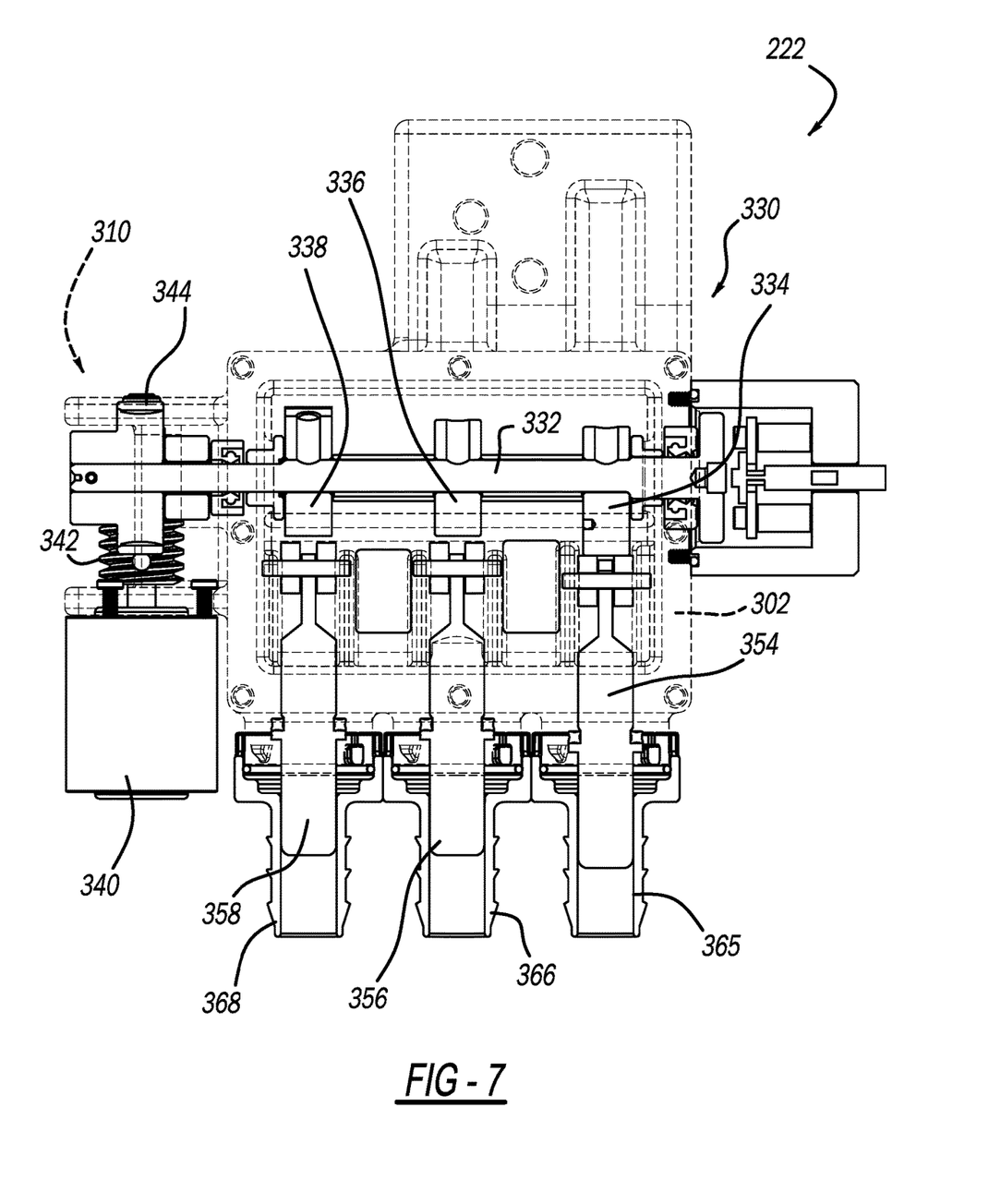
FIG. 7 is a sectional view of a vent shut-off assembly constructed in accordance to another example of the present disclosure.

Turning now to FIG. 7, a vent shut-off assembly 222 constructed in accordance to another example of the present disclosure will be described. Unless otherwise described, the vent shut-off assembly 222 is constructed similarly to the vent shut-off assembly 22 described above. The vent shut-off assembly 222 includes a main housing 302 that at least partially houses an actuator assembly 310. A canister vent line (not particularly shown) routes to the canister (see canister 32, FIG. 1). As can be appreciated, vapor that vents through any of the vent openings 41A-41C will be routed though the canister vent line (see canister vent line 70, FIG. 1) and to the canister 32.

The vent shut-off assembly 222 includes a cam assembly 330. The cam assembly 330 includes a cam shaft 332 that includes cams 334, 336 and 338. The cam shaft 132 is rotatably driven by a motor 340. In the example shown the motor 340 is a direct current motor that rotates a worm 342 that in turn drives a drive gear 344. The motor 340 is mounted outboard of the main housing 302. Other configurations are contemplated. The cams 334, 336 and 338 rotate to open and close valves 354, 356 and 358, respectively. The valves 354, 356 and 358 open and close to selectively deliver vapor through ports 365, 366 and 368, respectively. It will be appreciated that the cams 334, 336 and/or 338 may have cam profiles that allow fully closed, fully open and partially open valve conditions according to a given application. In the example shown in FIG. 7, each of the valves 354, 356 and 368 are configured as the larger flow orifice (164, FIG. 2) to collectively accommodate increased flow. It is contemplated that the ports 365, 366 and 368 can be 7.5 mm orifices.

Figure 8:
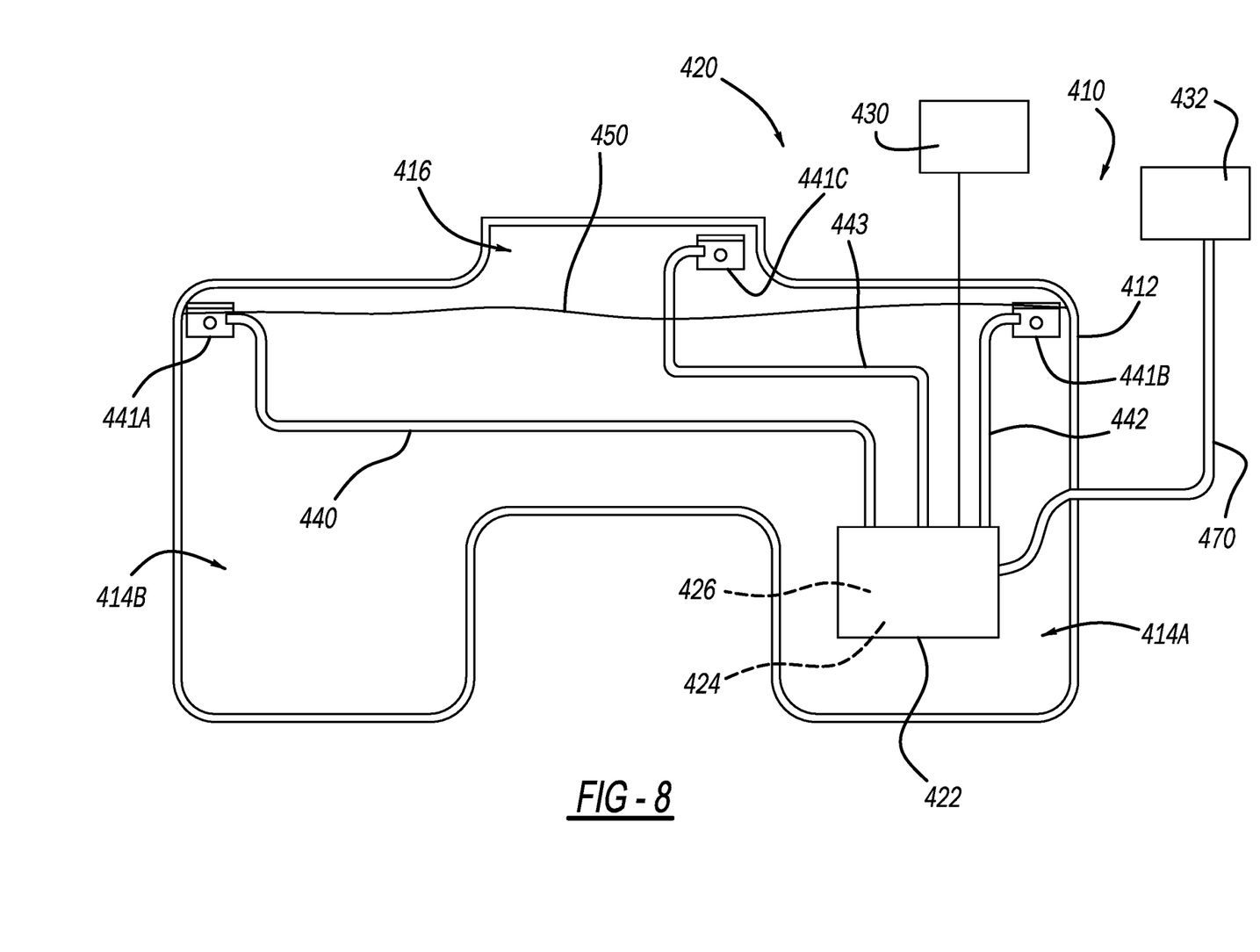
FIG. 8 is a cross-sectional view of a saddle fuel tank having a vent shut-off assembly constructed in accordance to another example.

With reference now to FIG. 8, a fuel tank system constructed in accordance to another example of the present disclosure is shown and generally identified at reference 410. The fuel tank system 410 can generally include a fuel tank 412 configured as a reservoir for holding fuel to be supplied to an internal combustion engine via a fuel delivery system, which includes a fuel pump. Unless otherwise described herein, the components of the fuel tank system 410 are similar to those described above directed to the fuel tank system 10. In this regard, the fuel tank system 410 can incorporate like components as described with respect to the fuel tank system 10 such as, but not limited to the fuel fill sensor assembly 48.

The fuel tank 412 is a saddle tank generally having a first lobe 414A and a second lobe 414B. The saddle fuel tank 412 can be particularly suitable for an all-wheel-drive vehicle as the open space between the lobes 414A and 414B can accommodate powertrain components. A raised portion 416 is arranged generally at a top portion of the fuel tank 412. An evaporative emissions control system 420 can be configured to recapture and recycle the emitted fuel vapor. As will become appreciated from the following discussion, the evaporative emissions control system 420 provides an electronically controlled module that manages the complete evaporative system for a vehicle.

The evaporative emissions control system 420 includes a vent shut-off assembly 422, a manifold assembly 424, a liquid trap 426, a control module 430, a purge canister 432, a first vapor tube 440, a second vapor tube 442, a third vapor tube 443 and a canister vent tube 470. The first vapor tube 440 can terminate at a grade vent valve or vent opening 441A that may include a baffle arranged at a top corner of the fuel tank 412. Similarly, the second vapor tube 442 can terminate at a grade vent valve or vent opening 441B that may include a baffle arranged at a top corner of the fuel tank 412. The third vapor tube 443 can terminate at a grade vent valve or vent opening 441C that may include a baffle arranged in the raised portion 416 of the fuel tank 412. The vent opening 441C can generally be located in a location elevated relative to the other vent openings 441A and 441B. In the example shown in FIG. 8, fuel 450 has reached an elevation within the fuel tank 412 generally above the vent openings 441A and 441B but not the vent opening 441C. During a refueling event, as a fuel 450 reaches a level above the vent openings 441A and 441B (see FIG. 8), venting can still be accomplished through the vent opening 441C.

The vent shut-off assembly 422 can be constructed similarly to the vent shut-off assembly 22 or 222 described above. As such, the components and their construction will not be repeated here. In the fuel tank system 420, the vent opening 441C can be used (open) during refueling and subsequent to refueling. While the vent openings 441A and 441B may be buried (below the level of the fuel 450), the vent opening 441C, being positioned in the raised portion 416, remains within the vapor space of the fuel tank 412 and able to vent. As with the configuration described above, venting can be accomplished through the canister vent line 470 to the purge canister 432. In one arrangement, the vent line 443 can be configured as a large orifice vent line such as described above with respect to port 164 to accommodate high flow during refueling. The vent lines 440 and 442 can be configured with smaller diameter lines as compared to the vent line 443.

In one configuration, the cams associated with opening valves on the vent lines 440 and 442 can have cam profiles that are configured for two positions, closed and opened such as to 3 mm. The cam associated with opening the valve on the vent line 443 can be configured for three positions, closed, open fully such as to 8 mm or 10 mm and partially open such as to 3 mm. Again, the vent line 443 can be configured for fully open operation during refueling. During normal vehicle operation it may be desirable to rotate the associated cam to the partially opened position (such as 3 mm).

Figure 9:
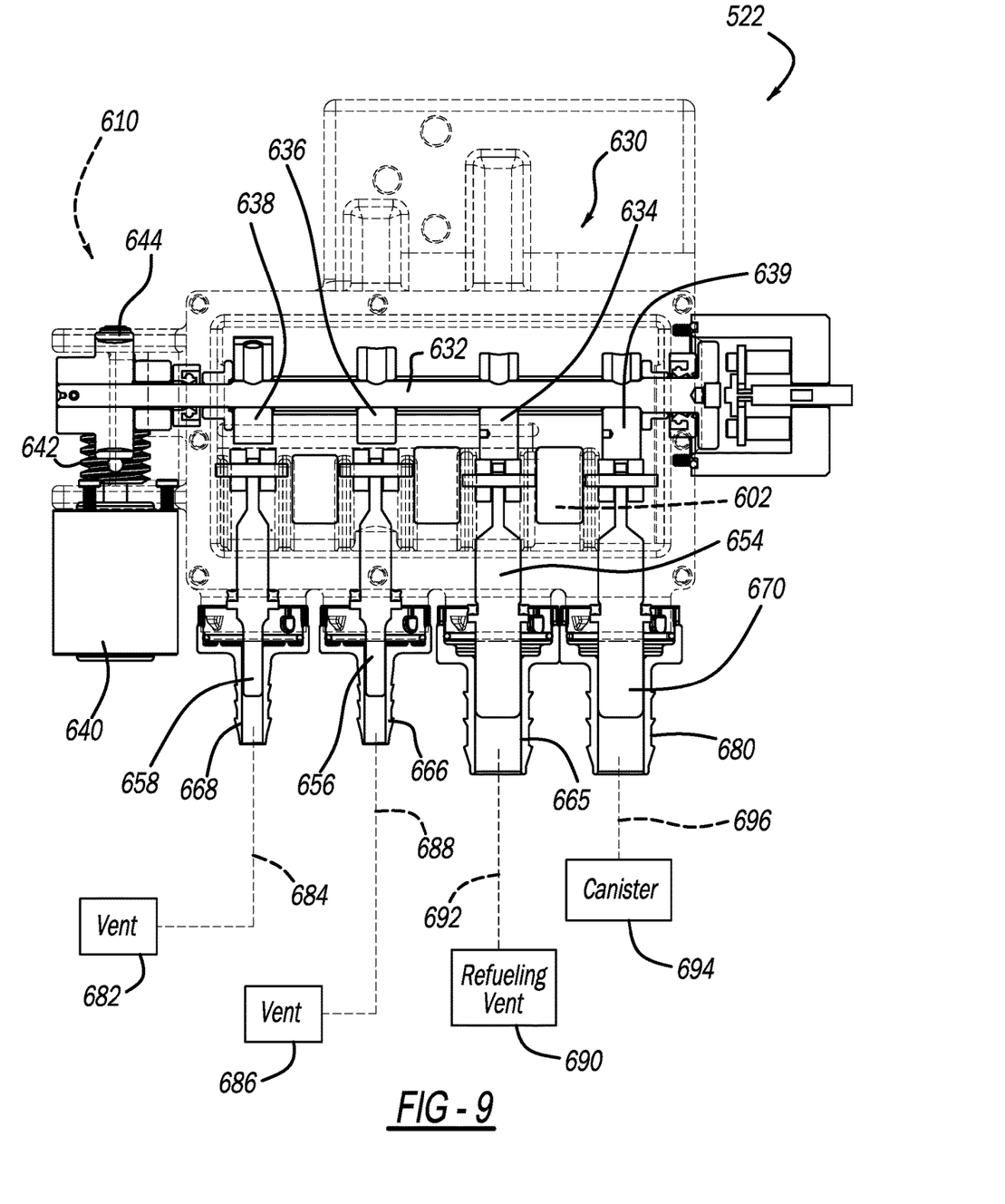
FIG. 9 is a sectional view of a vent shut-off assembly constructed in accordance to another example of the present disclosure.

Turning now to FIG. 9, a vent shut-off assembly 522 constructed in accordance to another example of the present disclosure will be described. Unless otherwise described, the vent shut-off assembly 522 is constructed similarly to the vent shut-off assembly 22 described above. The vent shut-off assembly 522 includes a main housing 602 that at least partially houses an actuator assembly 610.

A first vent tube or line 684 routes to a vent 682. A second vent tube or line 688 vents to a vent 686. A refueling vent tube or line 692 routes to a refueling vent 690. A canister vent tube or line 696 routes to the canister 694. As can be appreciated, vapor that vents through any of the vents 682, 686 and 690 will be routed through the canister vent line 696 and to the canister 694.

The vent shut-off assembly 522 includes a cam assembly 630. The cam assembly 630 includes a cam shaft 632 that includes cams 634, 636, 638 and 639. The cam shaft 632 is rotatably driven by a motor 640. In the example shown the motor 640 is a direct current motor that rotates a worm gear 642 that in turn drives a drive gear 644. The motor 640 is mounted outboard of the main housing 602. Other configurations are contemplated. The cams 634, 636, 638 and 639 rotate to open and close valves 654, 656, 658 and 670 respectively. The valves 654, 656, 658 and 670 open and close to selectively deliver vapor through ports 665, 666, 668 and 680, respectively. It will be appreciated that the cams 634, 636, 638 and/or 639 may have cam profiles that allow fully closed, fully open and partially open valve conditions according to a given application. In the example shown in FIG. 9, both of the valves 654 and 670 are configured as the larger flow orifice (164, FIG. 2) to collectively accommodate increased flow. It is contemplated that the ports 665 and 680 can be 10 mm orifices.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. An evaporative emissions control system configured to recapture and recycle emitted fuel vapor on a vehicle fuel tank, the evaporative emissions control system comprising:
   a first vent tube disposed in the fuel tank;
   a second vent tube disposed in the fuel tank;
   a first vent valve fluidly coupled to the first vent tube that is configured to selectively open and close a first port fluidly coupled to the first vent tube;
   a second vent valve fluidly coupled to the second vent tube that is configured to selectively open and close a second port fluidly coupled to the second vent tube;
   a canister vent tube that vents from the fuel tank to a purge canister;
   a canister vent valve fluidly coupled to the canister vent tube that is configured to selectively open and close a canister port fluidly coupled to the canister vent tube;
   a vent shut-off assembly comprising a cam assembly having a cam shaft that includes a first cam that selectively opens and closes the first valve, a second cam that selectively opens and closes the second valve and a canister cam that selectively opens and closes the canister valve to provide overpressure and vacuum relief for the fuel tank; and
   a control module that regulates operation of the vent shut-off assembly based on operating conditions to vent the first vent valve, the second vent valve and canister vent valve.

2. The evaporative emissions control system of claim 1 wherein the second port is configured solely as a refueling port, the second port having a larger flow orifice relative to the first port, the second port configured to accommodate a higher flow rate than the first port, wherein during refueling, the second valve is opened by the second cam until the control module controls the vent shut-off assembly to close the second valve based on a fuel level reaching a predetermined level corresponding to a "Fill" position.

3. The evaporative emissions control system of claim 2, further comprising an actuator assembly that drives the cam assembly, the actuator assembly including a motor.

4. The evaporative emissions control system of claim 2, further comprising:
   a third vent tube disposed in the fuel tank;
   a third vent valve fluidly coupled to the third vent tube that is configured to selectively open and close a third port fluidly coupled to the third vent tube; and
   wherein the cam shaft includes a third cam that selectively opens and closes the third valve.

5. An evaporative emissions control system configured to recapture and recycle emitted fuel vapor on a vehicle fuel tank, the evaporative emissions control system comprising:
   a first vent tube disposed in the fuel tank, the first vent tube having a first diameter that supports a first flow rate, the first vent tube extending between a first vent opening and a first vent valve, the first vent valve disposed on the first vent tube that is configured to selectively open and close a first port fluidly coupled to the first vent tube;
   a second vent tube disposed in the fuel tank, the second vent tube having a second diameter that supports a second flow rate, the second flow rate being higher than the first flow rate, the second vent tube extending between a second vent opening and a second vent valve, the second vent valve disposed on the second vent tube that is configured to selectively open and close a second port fluidly coupled to the second vent tube and configured to support vapor flow during a refueling event;
   a vent shut-off assembly comprising a cam assembly having a cam shaft that includes a first cam that selectively opens and closes the first valve and a second cam that selectively opens and closes the second valve to provide overpressure and vacuum relief for the fuel tank;
   a purge canister fluidly coupled to the vent shut-off assembly through a canister vent line;
   a control module that regulates operation of the vent shut-off assembly based on operating conditions to vent the first and second vent valves to the purge canister; and
   wherein the vehicle fuel tank comprises a saddle tank having a first lobe, a second lobe and a raised portion arranged generally at a top portion of the fuel tank at an elevation above the first and second lobes, wherein the first vent opening is arranged generally in the first lobe and the second vent opening is arranged in the raised portion.

6. The evaporative emissions control system of claim 5 wherein the second diameter is at least twice as large as the first diameter.

7. The evaporative emissions control system of claim 5 wherein the second vent valve is positioned at an elevated location relative to the first vent valve when the vehicle is on level ground.

8. The evaporative emissions control system of claim 7 wherein during a refueling event, as fuel rises within the fuel tank, the first vent valve becomes submerged while the second vent valve remains in vapor space at the raised portion.

9. The evaporative emissions control system of claim 8 wherein the control module communicates with the vent shut-off assembly during the refueling event to close the first vent valve prior to closing the second vent valve.

10. The evaporative emissions control system of claim 5 wherein the first and second cams have respective cam profiles that correspond to at least a fully opened valve position, a fully closed valve position and a partially open valve position.

11. The evaporative emissions control system of claim 10 wherein the first and second vent valves are caused to selectively open and close based on rotation of the respective first and second cams to deliver fuel vapor through the respective first and second vent tubes.

12. The evaporative emissions control system of claim 11, further comprising an actuator assembly that drives the cam assembly, the actuator assembly including a motor, wherein the motor comprises a direct current motor that rotates a worm gear that in turn drives a drive gear coupled to the cam shaft.

13. The evaporative emissions control system of claim 5 wherein the second port is configured solely as a refueling port, wherein during refueling, the second valve is opened by the second cam until the control module controls the vent shut-off assembly to close the second valve based on a fuel level reaching a predetermined level corresponding to a "Fill" position.

14. The evaporative emissions control system of claim 5, further comprising:
   a third vent tube disposed in the second lobe of the saddle fuel tank;
   a third vent valve disposed on the third vent tube that is configured to selectively open and close a second port fluidly coupled to the third vent tube; and
   wherein the second vent valve is positioned at an elevated location relative to the third vent valve when the vehicle is on level ground.

15. A method of controlling an evaporative emissions control system associated with a fuel tank, the control system configured to recapture and recycle emitted fuel vapor through a canister vent line to a purge canister, the control system including, a first vent valve configured to selectively open and close a first vent positioned in a first location in the fuel tank, and a second vent valve configured to selectively open and close a second vent positioned in a second location in the fuel tank, the second location at an elevation above the first location, the method comprising:
   determining a first fuel tank fuel level;
   determining a second fuel tank fuel level;
   determining if the second fuel tank fuel level is greater than the first fuel tank fuel level;
   closing the first vent valve based on the second fuel tank fuel level being greater than the first fuel tank fuel level; and
   venting fuel vapor through the second vent valve and through the canister vent line to the purge canister; and
   continuing to vent fuel vapor through the second vent valve subsequent to fuel rising above the first vent valve.

16. The method of claim 15, wherein the control system further comprises a third vent valve arranged in a third location in the fuel tank, the third location at an elevation below the second location, the method further comprising:
   closing the third vent valve based on the second fuel tank fuel level being greater than the first fuel tank fuel level; and
   continuing to vent fuel vapor through the second valve subsequent to fuel rising above the third vent valve.

17. The method of claim 15 wherein determining the first and second fuel tank fuel level comprises receiving a signal from a fuel fill level sensor assembly.

18. The method of claim 15, further comprising:
   determining one of a vehicle grade position and a vehicle acceleration; and
   at least one of (i) closing at least one of the first and second vent valves based on the vehicle grade position, and (ii) closing at least one of the first and second vent valves based on the vehicle acceleration.

19. The method of claim 15 wherein the control system further includes a vent shut-off assembly including a first cam having a first cam profile corresponding to a fully closed valve position, a second cam profile corresponding to a partially opened valve position and a third cam profile corresponding to a fully opened valve position, the method further comprising:
   rotating the first cam to a position wherein the second cam profile opens the first vent valve to the partially opened position.

20. The method of claim 15 wherein the fuel tank is a saddle fuel tank having a first lobe, a second lobe and a raised portion arranged generally at a top portion of the fuel tank, above the first and second lobes wherein the first vent is positioned in the first lobe and the second vent is positioned in the raised portion.

21. The evaporative emissions control system of claim 2 wherein the second port has an orifice of 10 mm.

* * * * *